United States Patent
Al Mulhem

(10) Patent No.: US 12,234,704 B2
(45) Date of Patent: Feb. 25, 2025

(54) EXOTHERMIC DRILLING FLUID COMPOSITION AND METHOD OF USE

(71) Applicant: SAUDI ARABIAN OIL COMPANY, Dhahran (SA)

(72) Inventor: Abdulrahman Abdulaziz Al Mulhem, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/823,216

(22) Filed: Aug. 30, 2022

(65) Prior Publication Data
US 2024/0068328 A1 Feb. 29, 2024

(51) Int. Cl.
| | |
|---|---|
| E21B 31/03 | (2006.01) |
| C09K 8/05 | (2006.01) |
| E21B 36/00 | (2006.01) |
| E21B 47/00 | (2012.01) |
| G08B 21/18 | (2006.01) |

(52) U.S. Cl.
CPC .............. *E21B 36/008* (2013.01); *C09K 8/05* (2013.01); *E21B 31/03* (2013.01); *E21B 47/00* (2013.01); *G08B 21/18* (2013.01)

(58) Field of Classification Search
CPC ...... E21B 36/008; E21B 31/03; E21B 31/035; E21B 37/00; E21B 47/00; C09K 8/05; G08B 21/18
See application file for complete search history.

(56) References Cited

U.S. PATENT DOCUMENTS

| | | | | |
|---|---|---|---|---|
| 3,899,431 | A * | 8/1975 | Hayes | E21B 21/003 516/65 |
| 4,289,633 | A * | 9/1981 | Richardson | C09K 8/60 507/935 |
| 5,448,911 | A * | 9/1995 | Mason | E21B 44/00 73/152.47 |
| 9,657,552 | B2 | 5/2017 | Choudhary et al. | |
| 11,208,877 | B2 | 12/2021 | Al-Nakhli et al. | |
| 2014/0290951 | A1 * | 10/2014 | Al-Taq | E21B 37/06 166/300 |
| 2016/0237768 | A1 * | 8/2016 | Jamison | E21B 21/062 |

(Continued)

FOREIGN PATENT DOCUMENTS

CN 101323780 B 6/2010

OTHER PUBLICATIONS

Alade et al., "A Novel Method of Removing Emulsion Blockage after Drilling Operations Using Thermochemical Fluid," SPE Drilling & Completion 36(01): 88-100, Mar. 17, 2021, 13 pages.

*Primary Examiner* — Nicole Coy
*Assistant Examiner* — Jennifer A Railey
(74) *Attorney, Agent, or Firm* — Osha Bergman Watanabe & Burton LLP

(57) ABSTRACT

Described is a drilling fluid composition with enhanced hole cleaning properties and a method of its use. Following an indication of sticking of a drill pipe during a drilling operation, a drilling fluid composition, including a first exothermic reactant, is injected into a subterranean formation. Then, a drilling fluid composition, including a second exothermic reactant, is injected into the subterranean formation. An exothermic reaction is allowed to occur between the first exothermic reactant and the second exothermic reactant within the subterranean formation.

11 Claims, 2 Drawing Sheets

(56) References Cited

U.S. PATENT DOCUMENTS

| | | | |
|---|---|---|---|
| 2016/0244661 A1* | 8/2016 | Almubarak | ............ C09K 8/845 |
| 2021/0115322 A1 | 4/2021 | Mahmoud | |
| 2022/0127521 A1 | 4/2022 | McRobbie et al. | |
| 2022/0127522 A1* | 4/2022 | McRobbie | .............. C06B 29/00 |

* cited by examiner

EXOTHERMIC DRILLING FLUID COMPOSITION AND METHOD OF USE

BACKGROUND

In oil and gas well drilling operations, drilling fluid, also referred to as drilling mud, is a heavy, viscous fluid mixture that is used to carry rock cuttings (also referred to as drill cuttings) to the surface. In addition, the drilling fluid lubricates and cools the drill bit. The drilling fluid, by hydrostatic pressure, also helps prevent the collapse of unstable strata into the borehole as well as the intrusion of water from water-bearing strata that may be encountered during drilling.

Hole cleaning is the ability of a drilling fluid to transport and suspend drill cuttings. Hole cleaning becomes a challenge when the drilling fluid is not efficient in carrying the drill cuttings out of the borehole. Drill cuttings may accumulate, and cause drill pipe sticking, thereby reducing drilling efficiency and cause other drilling problems. Conventionally, this issue is overcome by increasing the viscosity of the drilling fluid to improve the carrying capacity of the drilling fluid in lifting the drill cuttings. However, a more viscous drilling fluid may cause additional friction on the drill pipe, resulting in differential sticking.

Accordingly, there exists a need for a method for increasing the carrying capacity of drilling fluid while reducing drill pipe sticking.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an exothermic drilling fluid composition that includes an aqueous base fluid, one or more drilling fluid additives, and one or more exothermic reactants, including ammonium chloride and sodium nitrite.

In a further aspect, embodiments disclosed herein relate to a method for using an exothermic drilling fluid composition during drilling operations. The method may include evaluating a current state of a drill pipe during a drilling operation within a subterranean formation. Following an indication of sticking of the drill pipe during a drilling operation, a drilling fluid composition including a first exothermic reactant is injected into the subterranean formation. Then, a drilling fluid composition including a second exothermic reactant is injected into the subterranean formation. An exothermic reaction is allowed to occur between the first exothermic reactant and the second exothermic reactant within the subterranean formation. Finally, a new state of the drill pipe during the drilling operation is evaluated.

Other aspects and advantages of the claimed subject matter will be apparent from the following description and the appended claims.

DETAILED DESCRIPTION

In one aspect, embodiments disclosed herein relate to an exothermic drilling fluid composition and a method of using the exothermic drilling fluid composition during drilling operations to mitigate and alleviate drill pipe sticking.

Figure 1:
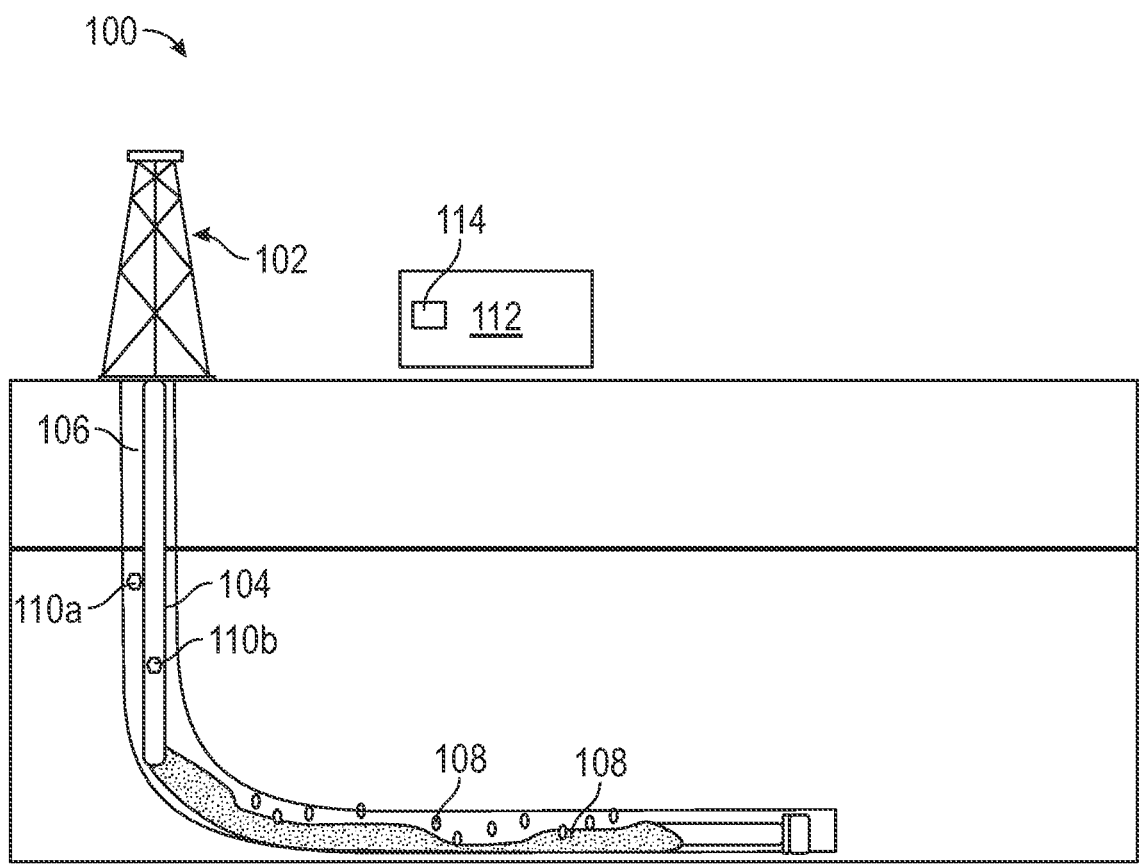
FIG. 1 is an illustration of a wellbore drilling operation site according to embodiments of the present disclosure.

The exothermic drilling fluid composition of the present disclosure may be used in the oil and gas drilling industries, such as for drilling in oil and gas wells. FIG. 1 illustrates an example of a wellbore drilling operation site (100). As illustrated in FIG. 1, oil and gas wells, or wellbores (102), may be formed in subterranean portions of the earth, often referred to as subterranean formations. In some embodiments, a wellbore (102) may be formed in a subterranean formation, for instance, by a drilling procedure.

To drill a subterranean well or wellbore (102), a drill pipe (104), including a drill string, a drill bit, and drill collars to weight the drill bit, may be inserted into a pre-drilled subterranean formation (106), or hole, and rotated to cut into the rock at the bottom of the hole, producing rock cuttings (108). Commonly, the drilling fluid, or drilling mud, may be utilized during the drilling process. To remove the rock cuttings (108) from the bottom of the wellbore (102), drilling fluid is pumped down through the drill string of the drill pipe (104) to the drill bit. The drilling fluid may cool and lubricate the drill bit and provide hydrostatic pressure in the wellbore (102) to provide support to the sidewalls of the wellbore (102). The drilling fluid may also prevent the sidewalls from collapsing and caving in on the drill pipe (104) and prevent fluids in the downhole formations from flowing into the wellbore (102) during drilling operations. Additionally, the drilling fluid may lift the rock cuttings (108) away from the drill bit and upwards as the drilling fluid is recirculated back to the surface. The drilling fluid may transport rock cuttings (108) from the drill bit to the surface, which can be referred to as "cleaning" the wellbore (102), or hole cleaning.

The rock or drill cuttings are broken bits of solid materials produced as rock or soil is broken apart that must be continuously removed from the borehole during drilling. The drill cuttings may vary based on the drilling application, and in some instances may include clay (shale), rock, or soil pieces. These pieces often begin to agglomerate, forming a dense slurry that may build up on the drill bit. The increasing use of water-based drilling fluids aggravates bit balling problems, as water from the drilling fluid may be absorbed by the drill cuttings, exacerbating their tendency to stick to the drill bit. Conventionally, this issue is overcome by increasing viscosity of the drilling fluid to improve the carrying capacity of the drilling fluid in lifting the drill cuttings. However, a more viscous drilling fluid may cause additional friction on the drill pipe, resulting in differential sticking.

The drilling fluid may include an aqueous base fluid, such as water, in addition to other drilling fluid additives. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and, thus, the drilling fluid, such as density. Non-limiting examples of suitable salts include alkali metal chlorides, hydroxides, carboxylates, sodium, calcium, cesium, zinc, aluminum, magnesium, potassium, strontium, silicon, lithium, chlorides, bromides, carbonates, iodides, chlorates, bromates, formates, nitrates, nitrites, sulfates, phosphates, oxides, and fluorides, or any combination thereof.

The drilling fluid may contain from 10 wt. % to 95 wt. % water based on the total weight of the drilling fluid. In one or more embodiments, the drilling fluid may comprise greater than 70 wt. % water based on the total weight of the drilling fluid.

The drilling fluid may include an aqueous base fluid, such as oil, non-limiting examples of which include diesel oil, mineral oil, vegetable oil, cooking oil, and/or synthetic-based compounds. The drilling fluid may be water-based or oil-based.

In one or more embodiments, the drilling fluid may comprise one or more clay-based materials. In one or more embodiments the drilling fluid may comprise a clay-based component that may be any clay-based material or mud suitable for use in drilling fluids, which may vary based on the application of use. In some embodiments, the clay-based component may contain, for instance, lime (CaO), CaCO3, bentonite, montmorillonite clay, barium sulfate (barite), hematite (Fe2O3), mullite (3Al2O3·2SiO2 or 2Al2O3·SiO2), kaolin, (Al2Si2O5(OH)4 or kaolinite), alumina (Al2O3, or aluminum oxide), silicon carbide, tungsten carbide, and combinations thereof. In some embodiments, the clay-based component may be bentonite. Without being bound by any particular theory, use of a clay-based component may increase the viscosity and rheology of the drilling fluid to allow for better drill lubrication, shear strength, and transportation of cuttings.

The drilling fluid may contain from 0.01 wt. % to 20 wt. % of the clay-based component based on the total weight of the drilling fluid. In one or more embodiments, the drilling fluid may contain from 5, 7, 9, 10, 12, 14 and 15 wt. % to 12, 14, 16, 17, 18, 19 and 20 wt. % of the clay-based component based on the total weight of the drilling fluid, where any lower limit may be combined with any mathematically feasible upper limit.

In one or more embodiments, the drilling fluid may comprise one or more additional additives, such as weighting agents (e.g., calcium carbonate), fluid loss control agents, lost circulation control agents, antifoaming agents, fluid loss additives, viscosity adjusters, an alkali reserve, specialty additives, and any combinations of these.

In one or more embodiments, the drilling fluid may have a pH ranging from 5, 5.5, 6, 6.5, 7, 7.5, 8, 8.5, 9, 9.5, and 10 to 6, 6.5, 7, 7.5, 8, 8.5, 9, 9.5, 10, 10.5 and 11, where any lower limit may be combined with any mathematically feasible upper limit.

In some embodiments, the drilling fluid may contain from 0.01 wt. % to 20 wt. % of the one or more additives, not including the clay-based component, based on the total weight of the drilling fluid. In one or more embodiments, the drilling fluid may contain from 0.1, 0.5, 1.0, 1.5, 2.0, 2.5 and 3.0 wt. % to 2.0, 2.5, 3.0, 3.5, 4.0, 5 and 20 wt. % of the clay-based component based on the total weight of the drilling fluid, where any lower limit may be combined with any mathematically feasible upper limit.

The wellbore drilling operation site (100) may further include one or more torque sensors (110) to measure rotation of the drill pipe (104). A torque sensor (110a) may be positioned within the subterranean formation (106). Alternatively, the drill pipe (104) itself may include a torque sensor (110b). Torque measurements, or readings, may be transmitted to a control unit (112) at the wellbore drilling operation site (100) for evaluation by a drilling operator, or other user. In one or more embodiments, the control unit (112) includes a control panel (114) that receives torque measurements as well as any alerts.

In one or more embodiments, the method and composition described herein may include a drilling fluid supplement that includes or is composed of exothermic reactants. Exothermic chemicals react to produce nitrogen gas, heat, and water. In one or more embodiments, the drilling fluid supplement may include ammonium chloride ($NH_4Cl$) (first reactant) and sodium nitrite ($NaNO_2$) (second reactant). A mixture of $NH_4Cl$ and $NaNO_2$ will react to produce nitrogen gas, water, and sodium chloride (NaCl) as follows:

$$NH_4Cl + NaNO_2 \rightarrow N_2 + 2H_2O + NaCl.$$

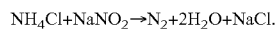

The reaction between the first reactant and the second reactant is instantaneous once the reactants come in contact with each other. During hole cleaning, the exothermic effect of the exothermic chemicals produces gas and water in the drilling fluid. The interfacial tension between the drilling fluid and gas causes an increased lifting effect for the drill cuttings, thereby reducing friction on the drill pipe. The exothermic chemicals may be in powder or liquid formulations.

In some embodiments, the exothermic chemicals are added to the drilling fluid at a concentration of 1%; however, the concentration may be adjusted, as needed, depending on the outcome. For instance, an increased concentration of exothermic chemicals in subsequent administrations may be needed to provide more thorough cleaning of the borehole if an initial concentration is not deemed effective.

Figure 2:
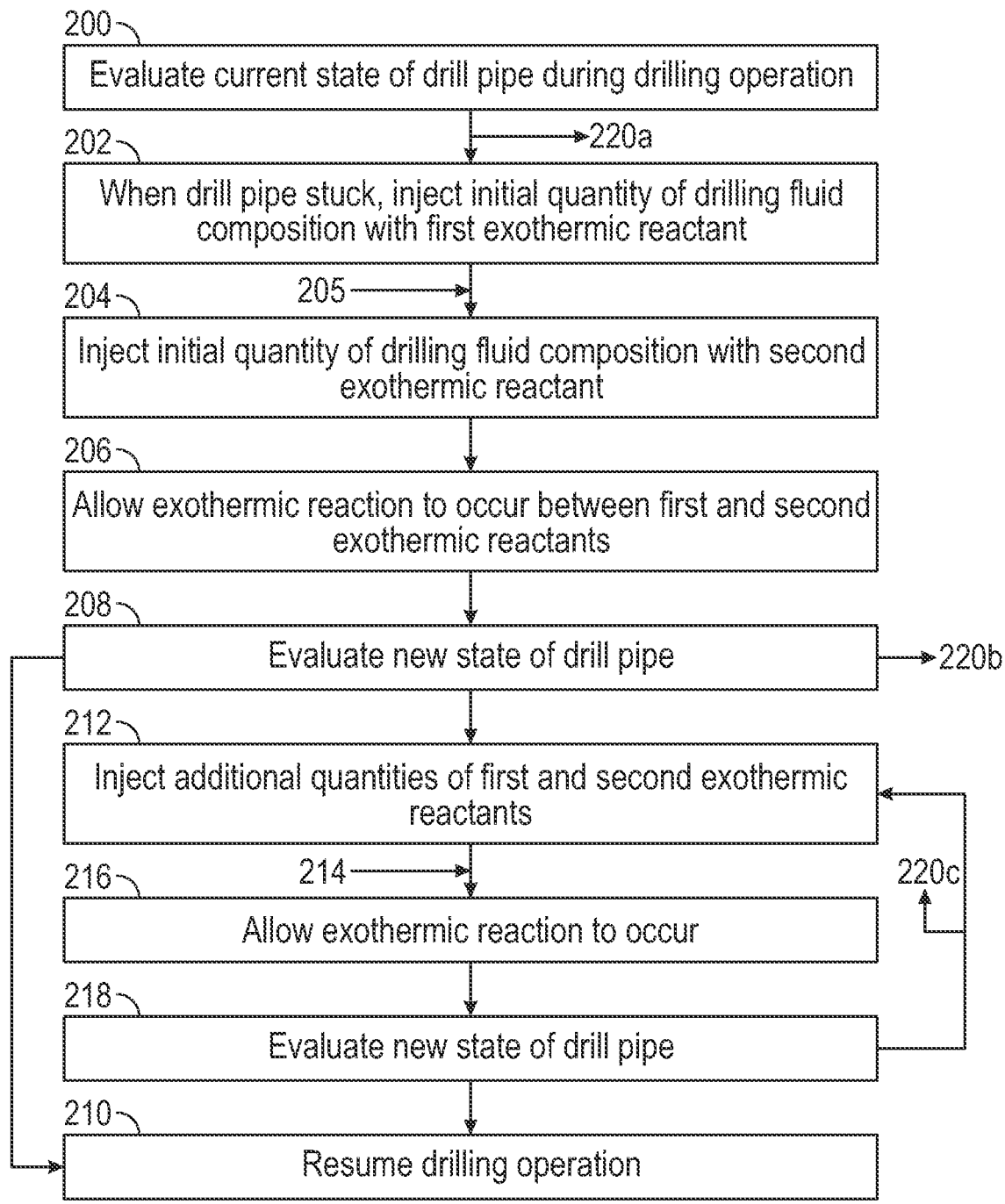
FIG. 2 is an illustration of a method for using an exothermic drilling fluid composition in drilling operations according to embodiments of the present disclosure.

FIG. 2 illustrates a method of using a drilling fluid composition with exothermic properties according to one or more embodiments of the present disclosure. In a step (200), a current state of the drill pipe is evaluated during a drilling operation in a subterranean formation. The current state evaluation may indicate that the drill pipe is operating as normal. Alternatively, the evaluation of the current state of the drill pipe may indicate that the drill pipe is unable to rotate and is stuck or is at risk of becoming stuck.

In a step (202), if it is determined that the drill pipe is stuck, an initial quantity of a first exothermic reactant, such as $NH_4Cl$, in drilling fluid may be injected into the subterranean formation via a slug (i.e., large quantity of gas or liquid) method. In a step (204), an initial quantity of a second exothermic reactant, such as $NaNO_2$, in drilling fluid may be injected into the subterranean formation. The initial quantity of the second exothermic reactant may be substantially similar to the initial quantity of the first exothermic reactant. In one or more embodiments, a buffer of the drilling fluid alone is injected between the first and second exothermic reactants to prevent the exothermic reaction from occurring prematurely in a step (205).

Following injection, an exothermic reaction is allowed to occur for a predetermined time period (approximately one minute) between the first exothermic reactant and the second exothermic reactant within the subterranean formation (borehole) in a step (206). Thereafter, a new state of the drill pipe is evaluated to determining whether the exothermic reaction has been successful in dislodging the drill pipe in a step (208).

If the evaluation determines that the drill pipe is no longer stuck and is freely rotating, then a drilling operation may be resumed in a step (210). If, following the evaluation in the step (208), the drill pipe remains stuck, the stuck drill pipe may be released by supplementing the drilling fluid with at least one additional quantity of each of the first and second exothermic reactants and injecting the drilling fluid compositions into the subterranean formation to mitigate the problem in a step (212). As described above, a buffer of the drilling fluid may be injected prior to injection of the second exothermic reactants to prevent the exothermic reaction from occurring prematurely in a step (214). Then, an exothermic reaction is allowed to occur for a predetermined time period (approximately one minute) between the additional quantities of the first and second exothermic reactants within the subterranean formation in a step (216). Finally, a new current state of the drill pipe is evaluated in a step (218).

In a desired aspect, the drilling process is continuous in that the drill pipe continuously rotates and a drilling mud pump continuously circulates drilling fluid. When a drilling operator personally observes differential sticking and/or receives an external indication of differential sticking, a determination may be made to administer the exothermic reactants. The drilling operator may sense, or observe, differential sticking when the drill pipe cannot be rotated or lifted up. Further, an external indication of high torque may be obtained from at least one torque sensor (FIG. 1, 110a and/or 110b) proximate the drill pipe.

Each torque sensor measures the torque (i.e., twisting/turning forces) of the drill pipe within the borehole and converts the input mechanical torque into an electrical output signal. The electrical output signal may be converted to measurement values in Newton-meters or $kgm^2 \, sec^{-2}$. The torque measurement values, may be displayed on a torque sensor gauge and/or transmitted to the control panel (FIG. 1, 114), such as a display screen, to indicate the current state of the drill pipe. The torque measurement values may indicate that the drill pipe is suffering from high torque with higher values, or it may indicate that drilling is progressing as normal with lower values.

The torque of the drill pipe in drilling operations depends on multiple distinct hole conditions. Non-limiting examples of varying conditions include mud weight, over pressure, hole inclination, and hole diameter. Therefore, changes in measurement values received from one or more torque sensors will be evaluated by the drilling operator based on the driller's experience with that particular well. As can be appreciated by one skilled in the art, an increase in one or more measurements received from a torque sensor during a drilling operation may provide an indication of a struck drill pipe, or an indication that the drill pipe is at risk of becoming stuck. In contrast, a decrease in one or more measurements received from a torque sensor during a drilling operation may provide an indication of a dislodged, or freely rotating, drill pipe.

In one or more embodiments, a user alert (220a, 220b, 220c) may be generated at any point in the process following an evaluation of the state of the drill pipe. The user alert (220a, 220b, 220c) may be generated based on the torque measurement values that indicate that the drill pipe is not operating effectively (i.e., stuck or becoming stuck). For instance, an electrical output signal may be transmitted from one or more torque sensors to alert a user, such as the drilling operator, of a current status of the drill pipe. The user alert may be a visual alert transmitted to a display of the control panel (FIG. 1, 114) of a user, such as torque measurement values displayed on a display screen. The user may periodically view the control panel display screen to determine if injection of the exothermic reactants according to embodiments of the present disclosure is required. Alternatively, the user alert may be an auditory alert, a haptic alert, or a tactile alert. Provided that the user alert is generated in a manner that is accessible to a user, the user alert may be any type of alert, or combination of alerts, that indicates the current state of the drill pipe.

As can be appreciated by one skilled in the art, additional exothermic reactants may also be added depending on the specific exothermic reaction desired. The exothermic reaction will occur when the two (or more) exothermic reactants come into contact downhole. As the reaction occurs, the final drilling fluid in the borehole will have an increased percentage of water due to the reaction of the exothermic chemicals. Additionally, the gas produced via the reaction will have a lifting effect on the drill pipe. The combination of the gas and water produced due to the exothermic reaction may increase the carrying capacity of the drilling fluid while also reducing friction between the drill pipe and the drilling fluid. The reduced friction may mitigate drill pipe sticking in subsequent drilling operations.

As a non-limiting example of the method according to embodiments of this disclosure, a quantity of the first exothermic reactant (e.g., 30 pounds (lbs.)) may be mixed with a volume of fluid (e.g., 30 gallons of water) and pumped into the drilling fluid. The drilling fluid may create a buffer to the exothermic reaction by serving to isolate the first exothermic reactant from the second exothermic reactant to prevent a premature exothermic reaction. In a desired aspect, the exothermic reaction will occur proximate the sandface (i.e., the physical interface between the formation and the wellbore) for effective treatment. Following a brief waiting period (e.g., approximately one minute), a quantity of the second exothermic reactant (30 lbs.) may be mixed with a volume of fluid (e.g., 30 gallons of water) and pumped into the drilling fluid. As the two drilling fluid compositions mix downhole, an exothermic reaction may occur, releasing the stuck pipe. The entire mixture of exothermic reactants and the reaction byproducts of nitrogen gas may assist in lifting drill cuttings and providing better hole cleaning. If the pipe remains stuck, as determined by drilling operator or a torque sensor, the process may be repeated with an additional quantity of the first reactant (e.g., 40 lbs.) mixed with an additional volume of fluid (e.g., 40 gallons of water), an additional quantity of the second reactant (e.g., 40 lbs.) mixed with an additional volume of fluid (e.g., 40 gallons of water, and pumping both fluids in the drilling fluid in the hole. The process may be repeated sequentially with larger quantities of both reactants and water until the stuck pipe is fully released.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for using an exothermic drilling fluid composition during drilling operations, the method comprising:
    evaluating a current state of a drill pipe during a drilling operation within a subterranean formation;

following an indication of sticking of the drill pipe during a drilling operation due to drill cuttings, injecting a first drilling fluid composition comprising an initial quantity of a first exothermic reactant and bentonite into the subterranean formation;

following injecting of the first drilling fluid composition comprising the first exothermic reactant, injecting a second drilling fluid composition comprising an initial quantity of a second exothermic reactant that is different from the first exothermic reactant and bentonite into the subterranean formation, wherein the first and second drilling fluid compositions comprising the first and second exothermic reactants, respectively, are injected separately;

allowing an exothermic reaction to occur between the first exothermic reactant and the second exothermic reactant within the subterranean formation, wherein the exothermic reaction produces gas and water such that interfacial tension between the drilling fluid composition and the gas causes an increased lifting effect for the drill cuttings, thereby reducing friction on the drill pipe; and evaluating a new state of the drill pipe during the drilling operation.

2. The method according to claim 1, wherein prior to injecting the second drilling fluid composition comprising the initial quantity of the second exothermic reactant, injecting a buffer into the subterranean formation.

3. The method according to claim 1, wherein the first exothermic reactant and the second exothermic reactant are comprised of ammonium chloride and sodium nitrite.

4. The method according to claim 1, wherein when the new state indicates that the drill pipe is no longer sticking, resuming the drilling operation.

5. The method according to claim 1,
wherein when the new state indicates that the drill pipe is still sticking, injecting the first drilling fluid composition having an additional quantity of the first exothermic reactant into the subterranean formation; and following injection of the first drilling fluid composition, injecting the second drilling fluid composition having an additional quantity of the second exothermic reactant into the subterranean formation.

6. The method according to claim 5, wherein prior to injecting the second drilling fluid composition, injecting a buffer into the subterranean formation.

7. The method according to claim 1, wherein evaluating the current state and the new state of the drill pipe is performed by at least one torque sensor proximate the drill pipe.

8. The method according to claim 1, wherein evaluating the current state and the new state of the drill pipe is performed by a drilling operator.

9. The method according to claim 1, further comprising generating at least one user alert indicating one or more of the current state and the new state of the drill pipe.

10. The method according to claim 9, wherein the at least one user alert is one or more of a visual alert, an auditory alert, and a haptic alert.

11. The method according to claim 9, wherein the at least one user alert is generated based on one or more measurements received from at least one torque sensor proximate the drill pipe.

* * * * *